UNITED STATES PATENT OFFICE.

EMIL JACOBSEN, OF BERLIN, GERMANY.

MANUFACTURE OF RED COLORING-MATTER.

SPECIFICATION forming part of Letters Patent No. 257,717, dated May 9, 1882.

Application filed March 13, 1882. (No specimens.)

*To all whom it may concern:*

Be it known that I, EMIL JACOBSEN, of the city of Berlin, in the Kingdom of Prussia, of the Empire of Germany, have invented a new and useful Improvement in the Manufacture of Red Coloring-Matters by the action of benzotrichloride on chinoline or pyridine; and I do hereby declare the same to be described as follows:

When equal quantities of chinoline and benzotrichloride are heated to 130° centigrade the mixture thickens gradually and assumes a red color. After heating for some hours for the purpose of withdrawing the base, the melt not acted upon is to be extracted with cold water and the residue afterward exhausted by a large excess of boiling water. The dark-red solution, on the addition of an alkali, yields a reddish-brown amorphous precipitate of a color. To purify the same it is next to be dissolved in an acid—for instance, oxalic or acetic acid—and once more precipitated by an alkali. The base of the color is insoluble in ether and ligroine, very little soluble in water, but easily soluble in spirit as well as in glacial acetic acid. The solutions of the base and its salts are of a red color and show a very intense yellow fluorescence, which is also visible on wool as well as on silk when dyed with it. Cotton mordanted with tannin is easily dyed by the color and resists the strongest soap-baths. The salts of the base are comparatively insoluble in water, easier soluble in alchohol. The hydrochlorate forms with chloride of zinc a nearly insoluble double salt. When the solution of a salt of the base is cautiously mixed with bromine-water the solution changes into a darker and more violet shade. Silk as well as wool dyed with the chrominated color is fast, but shows no fluorescence.

Substances causing condensation, as chloride of zinc, protoxide of zinc, accelerate the reactions, but without improving the coloring-matter. Likewise does adoption of a higher temperature, but it is not profitable so to work.

The easily soluble hydrochlorate of the dye produced from the above-mentioned bases is precipitated from its solutions by chloride of zinc in form of a reddish-brown powder.

I claim as my invention—

The mode or process, substantially as described, for the manufacture of the red or violet coloring-matter, as explained, the said process consisting in heating a mixture of equal, or about equal, parts of chinoline or pyridine and benzotrichloride, and subsequently treating such with water, an acid, and an alkali, as set forth.

In testimony that I claim the foregoing as my own I affix my signature in presence of two witnesses.

DR. EMIL JACOBSEN.

Witnesses:
B. ROI,
T. C. ZIMMERMAN.